(12) United States Patent
Schick et al.

(10) Patent No.: US 7,783,507 B2
(45) Date of Patent: *Aug. 24, 2010

(54) SYSTEM AND METHOD FOR MANAGING A FLEET OF REMOTE ASSETS

(75) Inventors: Louis A Schick, Delmar, NY (US); Kimberley M. Mangino, Niskayuna, NY (US); Gregory James Hampson, Saratoga Springs, NY (US); Paul Edward Cuddihy, Schenectady, NY (US); Gregory John Fera, Erie, PA (US); Richard Gerald Bliley, Erie, PA (US); Luis Ivan Gomez Meneses, Erie, PA (US); Michael James Pierro, Erie, PA (US); James E. Schlabach, Erie, PA (US); William Roy Schneider, Erie, PA (US)

(73) Assignee: General Electric Company, Schenectady, NY (US)

( * ) Notice: Subject to any disclaimer, the term of this patent is extended or adjusted under 35 U.S.C. 154(b) by 1541 days.

This patent is subject to a terminal disclaimer.

(21) Appl. No.: 09/736,495

(22) Filed: Dec. 13, 2000

(65) Prior Publication Data

US 2002/0065698 A1    May 30, 2002

Related U.S. Application Data

(63) Continuation-in-part of application No. 09/644,420, filed on Aug. 23, 2000, which is a continuation-in-part of application No. 09/410,553, filed on Oct. 1, 1999, now Pat. No. 6,263,265, and a continuation-in-part of application No. 09/378,939, filed on Aug. 23, 1999, now Pat. No. 6,301,531, and a continuation-in-part of application No. 09/378,940, filed on Aug. 23, 1999, now abandoned.

(60) Provisional application No. 60/201,243, filed on May 1, 2000.

(51) Int. Cl.
G06F 9/44 (2006.01)
(52) U.S. Cl. .......................................................... 705/7
(58) Field of Classification Search ....................... None
See application file for complete search history.

(56) References Cited

U.S. PATENT DOCUMENTS 4,270,174 A    5/1981   Karlin et al.

(Continued)

OTHER PUBLICATIONS

Data-Tronic Gas Turbine Information And Control System; General Electric Gas Turbine Reference Library; 8 pgs.

(Continued)

Primary Examiner—Janice A. Mooneyham
Assistant Examiner—Michael J Fisher
(74) Attorney, Agent, or Firm—Robert Wawrzyn, Esq.; Enrique Mora, Esq.; Beusse, Wolter, Sanks, Mora & Maire, P.A.

(57) ABSTRACT

Method and system for managing a plurality of remote assets, such as a fleet mobile assets is provided. The method allows for collecting data regarding each of a plurality of remote assets. The collected data is used to develop historical information regarding actual usage of each remote asset. The information is distributed via a global information network.

32 Claims, 12 Drawing Sheets

U.S. PATENT DOCUMENTS

| | | |
|---|---|---|
| 4,404,639 A | 9/1983 | McGuire et al. |
| 4,463,418 A | 7/1984 | O'Quin, II et al. |
| 4,517,468 A | 5/1985 | Kemper et al. |
| 4,695,946 A | 9/1987 | Andreasen et al. |
| 4,697,243 A | 9/1987 | Moore et al. |
| 4,823,914 A | 4/1989 | McKinney et al. |
| 4,970,725 A | 11/1990 | McEnroe et al. |
| 4,977,390 A | 12/1990 | Saylor et al. |
| 5,111,391 A | 5/1992 | Fields et al. |
| 5,113,489 A | 5/1992 | Cihiwsky et al. |
| 5,123,017 A | 6/1992 | Simpkins et al. |
| 5,274,572 A | 12/1993 | O'Neill et al. |
| 5,282,127 A | 1/1994 | Mii |
| 5,321,837 A | 6/1994 | Daniel et al. |
| 5,329,465 A | 7/1994 | Arcella et al. |
| 5,400,018 A | 3/1995 | Scholl et al. |
| 5,406,502 A | 4/1995 | Haramaty et al. |
| 5,445,347 A | 8/1995 | Ng |
| 5,508,941 A | 4/1996 | Leplingard et al. |
| 5,528,516 A | 6/1996 | Yemini et al. |
| 5,594,663 A | 1/1997 | Messaros et al. |
| 5,623,404 A | 4/1997 | Collins et al. |
| 5,633,628 A | 5/1997 | Denny et al. |
| 5,638,296 A | 6/1997 | Johnson et al. |
| 5,661,668 A | 8/1997 | Yemini et al. |
| 5,666,534 A | 9/1997 | Gilbert et al. |
| 5,678,002 A | 10/1997 | Fawcett et al. |
| 5,717,595 A | 2/1998 | Cherrington et al. |
| 5,740,046 A | 4/1998 | Elestedt |
| 5,740,547 A | 4/1998 | Kull et al. |
| 5,742,915 A | 4/1998 | Stafford |
| 5,778,381 A | 7/1998 | Sandifer |
| 5,786,998 A | 7/1998 | Neeson et al. |
| 5,806,011 A | 9/1998 | Azzaro et al. |
| 5,819,273 A | 10/1998 | Vora et al. |
| 5,845,272 A | 12/1998 | Marjaria et al. |
| 5,867,801 A | 2/1999 | Denny |
| 5,902,985 A | 5/1999 | Bos et al. |
| 5,905,433 A | 5/1999 | Wortham |
| 5,913,914 A | 6/1999 | Kemner et al. |
| 5,922,040 A | 7/1999 | Prabhakaran |
| 5,931,877 A | 8/1999 | Smith et al. |
| 5,931,878 A | 8/1999 | Chapin et al. |
| 5,950,147 A | 9/1999 | Sarangapani et al. |
| 5,961,560 A | 10/1999 | Kemner |
| 5,978,717 A | 11/1999 | Ebersohn et al. |
| 6,052,631 A | 4/2000 | Busch et al. |
| 6,067,486 A | 5/2000 | Aragones et al. |
| 6,070,155 A | 5/2000 | Cherrington et al. |
| 6,115,691 A | 9/2000 | Ulwick |
| 6,167,333 A | 12/2000 | Gehlot |
| 6,170,742 B1 | 1/2001 | Yacoob |
| 6,182,048 B1 | 1/2001 | Osborn et al. |
| 6,216,108 B1 | 4/2001 | LeVander |
| 6,219,597 B1 | 4/2001 | Longere |
| 6,240,365 B1 | 5/2001 | Bunn |
| 6,260,048 B1 | 7/2001 | Carpenter et al. |
| 6,263,265 B1 | 7/2001 | Fera |
| 6,263,266 B1 | 7/2001 | Hawthorne |
| 6,263,322 B1 | 7/2001 | Kirkevold et al. |
| 6,301,531 B1 * | 10/2001 | Pierro et al. .................. 701/29 |
| 6,330,499 B1 * | 12/2001 | Chou et al. .................... 701/33 |
| 6,480,810 B1 * | 11/2002 | Cardella et al. ............. 702/188 |

OTHER PUBLICATIONS

Forbes Magazine, Insurance by The Minute, Dec. 11, 2000.

* cited by examiner

LOCOMOTIVE CITY/STATE PROXIMITY

CITY: LOS ANGELES
STATE: CA
RANGE: 100 MILES

SEND QUERY:
SUBMIT

| ALL LOCOMOTIVES WITHIN 100 MILE RADIUS OF LOS ANGELES, CA ||
|---|---|
| LOCOMOTIVE | LOCATION |
| 8618 | 1.9 MILES E OF CARSON, CA |
| 8444 | 1.9 MILES N OF MIRA LOMA, CA |
| 8350 | 1.3 MILES NW OF PEDLEY, CA |

*FIG. 9*

GE TRANSPORTATION SYSTEMS

TROUBLESHOOTING GUIDE
FOR BNSF DASH 8 LOCOMOTIVES

REV 0
84A207789

TROUBLESHOOTING GUIDE

FOR

BURLINGTON NORTHERN SANTA FE (BNSF) DASH 8 LOCOMOTIVES

SYSTEM AND METHOD FOR MANAGING A FLEET OF REMOTE ASSETS

This application is a continuation-in-part of co-pending and commonly assigned U.S. patent application Ser. No. 09/644,420 filed Aug. 23, 2000, which in turn is a continuation-in-part of (1) U.S. patent application Ser. No. 09/410,553, filed Oct. 1, 1999, now U.S. Pat. No. 6,263,265 a continuation-in-part of (2) U.S. patent application Ser. No. 09/378,939, filed Aug. 23, 1999, now U.S. Pat. No. 6,301,531 and a continuation-in-part of (3), U.S. patent application Ser. No. 09/378,940, filed Aug. 23, 1999 now abandoned. U.S. patent application Ser. No. 09/644,420 filed Aug. 23, 2000 also claims benefit of U.S. provisional patent application Ser. No. 60/201,243 filed May 1, 2000.

BACKGROUND OF THE INVENTION

The present invention relates generally to the field of managing a fleet of remote assets. In one exemplary embodiment, the invention is described in the application of managing a fleet of mobile assets.

The management of a large fleet of remote assets, particularly when the fleet of assets comprises a fleet of mobile assets, such as a fleet of trucks, ships or railway locomotives, is a challenging logistical effort. There is continuing pressure for the owners and/or lessors, of such assets to improve the efficiency of operations of the assets to remain competitive in the market place. For example, railroads must manage their fleets of locomotives to maximize the on-train time in order to remain competitive with alternative modes of transportation. The assignee of the present invention is a supplier of locomotive engines and has developed numerous design features and services to maximize the efficiency of operation of its locomotives. The assignee of the present invention has also undertaken to provide integrated maintenance services to the owners and/or lessors of automotive assets. Such services may include managing fleet-related data among a plurality of maintenance service centers that supply necessary parts and labor. The coordination of the servicing of a large fleet of mobile assets and the communication with the various parties involved in such efforts are monumental tasks.

U.S. Pat. No. 5,845,272 dated Dec. 1, 1998, commonly owned with the present invention, describes a system and method for diagnosing failures in a locomotive. While such a system and method has proven beneficial, further improvements in fleet management are desired.

Additionally, operations of mobile assets such as commercial trucks, fleets of leased cars and even private vehicles are generally burdened by overspending on maintenance both in direct costs and in lost productivity of the assets due to unduly conservative maintenance schedules. Such schedules may generally represent the extreme asymmetry in effective cost of planned versus unplanned down time of the mobile assets. Thus, reliable and inexpensive data management services targeted at such assets, and, more specifically, to their operators is desirable. Dynamically and personalized timely delivery of information to operators of the remote assets presents a substantial opportunity for productivity enhancement of the assets, operators and financial investment of the service providers. Location information, as may be available through various navigation systems, such as a Global Positioning System (GPS) and other transponder-based systems, has yet to be leveraged in a systematic manner which enables cost-effective logistics planning, maintenance planning and targeted marketing. Various features available onboard the remote assets have not yet been fully exploited for usage profiling, planning, diagnostics, prognostics or subsystem optimization in the mobile assets. Examples of such features include computerized control of various subsystems used for operation of the remote assets, e.g., propulsion subsystem, climate control, engine, etc., local storage of fault codes and buffering, and storage and data reduction of analog or digital data that such subsystems automatically generate during their operation. The proposed system and techniques of the present invention are believed to appropriately address the foregoing shortcomings of presently implemented practices.

BRIEF SUMMARY OF THE INVENTION

Accordingly, a system and method are described herein for effectively integrating the diverse elements involved in the management of remote assets, e.g., a fleet of mobile assets. In one aspect thereof, the invention makes use of the data management powers of modem computer and global information networks by using such tools to collect, store, analyze, distribute and present information in a format and at a time when it can be used most effectively by people responsible for such assets.

In one exemplary embodiment, the invention includes the aspects of real-time data collection from each of the mobile assets, computerized analysis of such data for failure detection and prediction, and the planning of maintenance activities responsive to such failure predictions prior to the asset being taken out of service. The planning of maintenance activities includes the selection of an optimal time and location for performing the work, with consideration given to trends in the operating data, the availability of necessary repair resources, and other owner-defined criteria. Work planning further includes the automatic generation of appropriate work orders including the advance reservation of necessary service equipment, replacement parts and repair personnel. The various participants and stakeholders in these activities are provided with appropriate levels of information via a global information network. The information presentation power of the multi-media format of an Internet web site may be ideally suited in one exemplary embodiment for accomplishing many of the communication functions for implementing this invention. Other aspects of the invention include development of historical information regarding actual usage of each remote asset, and the arranging of that actual usage of the remote asset based on a plurality of operational modes of the asset. Each of said operational modes is indicative of a respective state of health of the asset. Service recommendations may be generated based on the actual usage of the asset. Further, various information, such as a cost/benefit evaluation of the asset, and warranty coverage may be further determined based on the actual usage of the asset.

BRIEF DESCRIPTION OF THE DRAWINGS

The features and advantages of the present invention will become apparent from the following detailed description of the invention when read with the accompanying drawings in which:

FIG. 9 illustrates a web page showing the output of a search engine accessible via a global information network identifying the proximity of locomotives to a repair shop.

DETAILED DESCRIPTION OF THE INVENTION

To effectively manage a fleet of mobile assets, it is necessary to avoid unexpected equipment failures and to accomplish maintenance and repair activities in a time efficient manner. There is a tremendous amount of information available related to a fleet of mobile assets. Such information may include design information, real time operating data, historical performance data including failure probabilities, parts inventories, and geographic information related to the assets, cargo being transported with the assets, parts, personnel and repair facilities, etc. Key to achieving efficient operation is the ability to communicate such information to people and places where it is needed, and to present the information in a format that makes it useful to accomplish the desired result.

Figure 1:
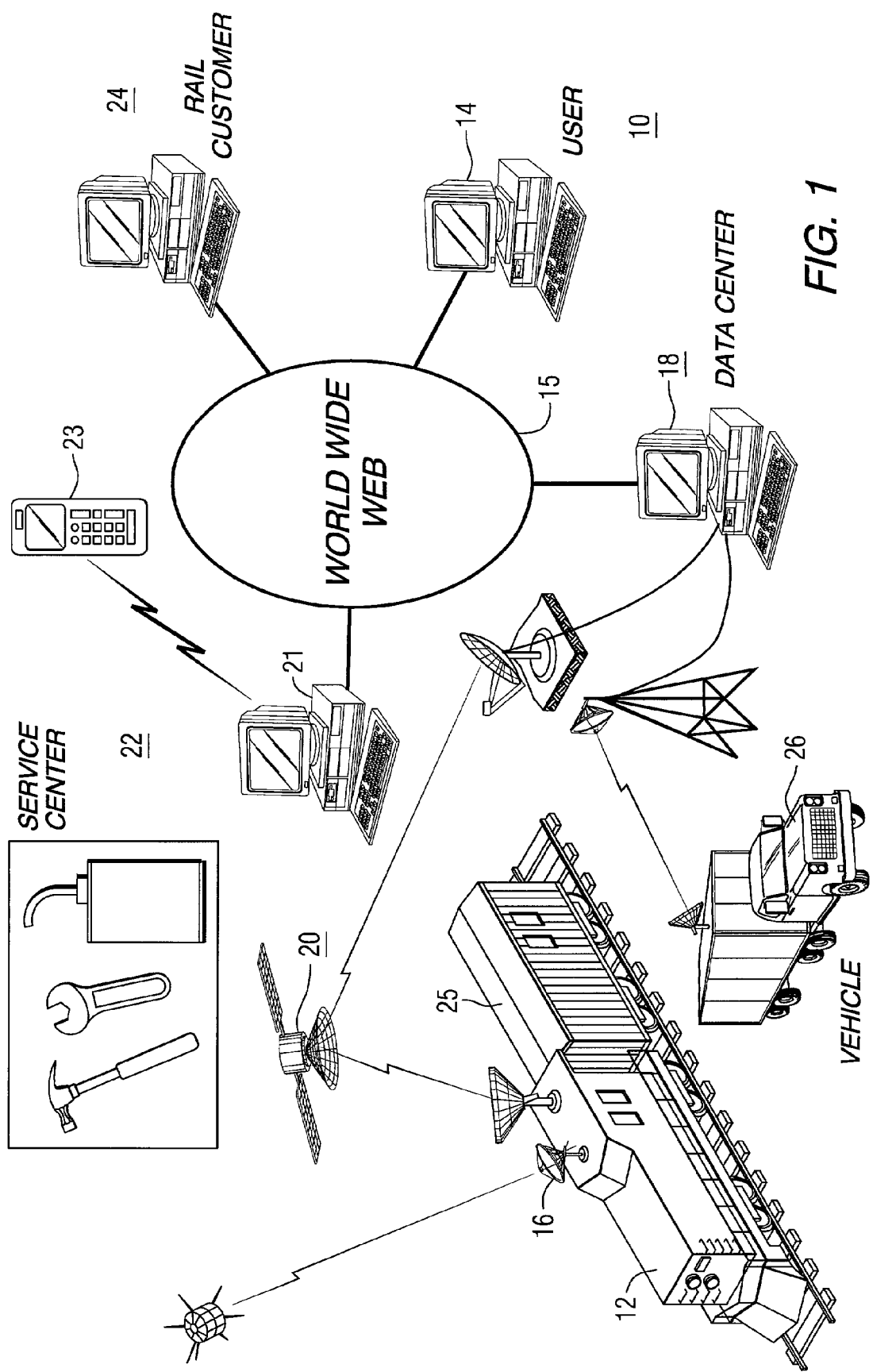
FIG. 1 is a schematic illustration of a communications network for managing a fleet of mobile assets.

Accordingly, the inventors have envisioned the system 10 of FIG. 1 for use in managing a fleet of remote assets. Although primarily illustrated and described with respect to a fleet of mobile assets, such as a fleet of locomotives 12, or a fleet of trucks 26, the invention may be implemented with other types of remote assets that may be deployed at a particular site for an extended period of time, such as crane loading equipment based on a port, excavation mining equipment based on a mine, agricultural farming equipment based on a farm, etc. Furthermore, the apparatus and method described herein are useful for managing not only mobile vehicles but also the cargo transported with such vehicles and dedicated subsystems that may be used for accomplishing the principal utility of the asset, such as the hoisting subsystem that may be used in a "cherry picker" truck, or the refrigeration subsystem used in a refrigerated mobile asset. The data management system 10 allows a variety of different types of users to obtain detailed and timely information regarding each of the mobile assets, e.g., 12 or 26. By way of example, such users may include a transportation company 14 who owns and operates the remote assets, or may include original equipment manufacturers (OEMs) that assemble the mobile asset and lease such assets to respective end users. The users may include a customer 24 or personnel of the transportation company and/or the OEM, personnel in an asset service center 22, personnel in a data center 18, and the engineer or driver that operates each individual asset. The mobile assets, e.g., 12 or 26, may be equipped with a plurality of sensors for monitoring a plurality of operating parameters representative of the condition of the remote asset and of the efficiency of its operation. The mobile assets, e.g., 12 or 26, may also be equipped with a GPS receiver 16 or other satellite-based or local navigation instrument for determining the geographic location of the mobile asset. Data regarding the location of the mobile asset and its operating parameters may be transferred periodically or in real time to a data base 18 by a data link 20, such as a satellite system, cell phone, optical or infrared system, hard-wired phone line, etc. By way of example, the assignee of the present invention operates such a data center 18 at its Monitoring and Diagnostics Service Center (MDSC) in Erie, Pa. Affiliated with such a data center 18 may be one or more service centers 22 where the mobile assets are taken for repair and maintenance services.

As illustrated in FIG. 1, the data center 18 and service center 22 may both be linked to a global information network, such as the Internet 15, by known types of data connections. Such links may typically be a computer interface through an internet service provider. The Internet and World Wide Web provide a means for communicating between the data center 18 and service center 22. Furthermore, these facilities may also be in communication with the transportation company user 14 via an Internet connection. Customers 24 of the transportation company or other members of the public may further be in communication with these facilities through Internet links. Because the Internet 15 and known web page formats provide cost-effective means for communicating data and information in a multi-media format, such a global information network is one example of a useful communication tool for displaying and communicating the large amount of data that may be associated with the operation of a fleet of mobile assets, e.g., 12 or 26.

Figure 2:
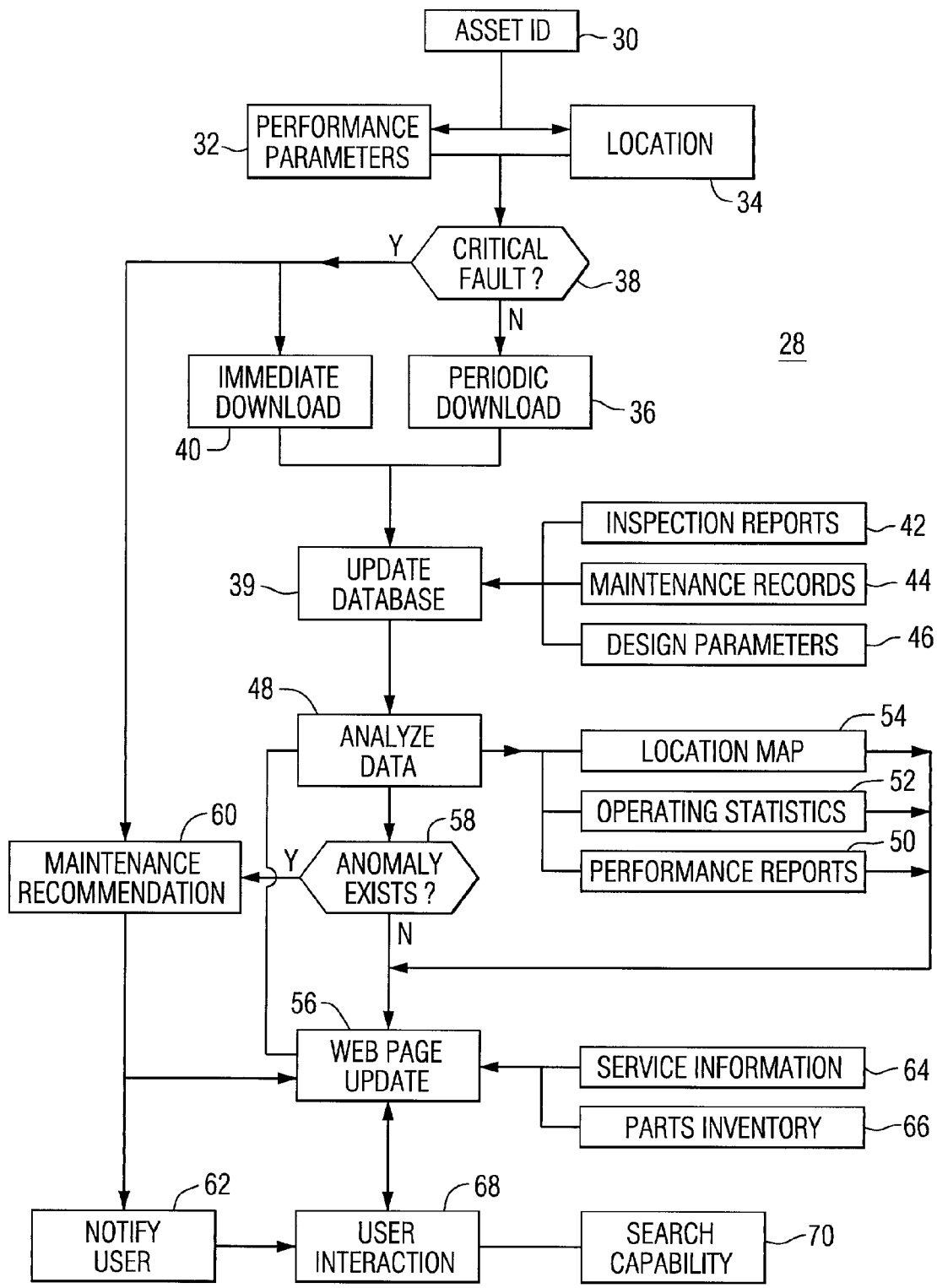
FIG. 2 illustrates the steps of a method for managing a fleet of mobile assets.

FIG. 2 illustrates exemplary steps of a method 28 for managing a fleet of mobile assets that may be implemented by using a data management system 10 as illustrated in FIG. 1. Each mobile asset may be uniquely identified, such as by an identification number, as in step number 30 of FIG. 2. One or more identifiers may also be associated with the cargo being transported with the mobile assets, e.g., 12 or 26. For respective embodiments of either the fleet of locomotives 12 or the fleet of trucks 26, the operating parameters of each of the mobile assets may be monitored 32 by the on-board sensors. In one exemplary embodiment, such operating parameters are monitored in real time, and data related to these operating parameters is available for communication to a data center 18 wherever appropriate. The location of each asset is also determined 34, such as by using a GPS receiver or by otherwise identifying the mobile asset relative to a particular location along the route of the asset. Data regarding both the location and the operating parameters for each mobile asset, e.g., 12 or 26, may be periodically downloaded 36 from an on-board data file to a centralized data base 39. The data may further include environmental conditions to which each mobile asset has been exposed to during their operation. Example of such data may include temperature, barometric pressure, terrain topography, humidity level, dust level, etc. In the event that a critical fault is identified 38 in one of the systems of a mobile asset, it may be preferred to download data from the mobile asset immediately 40 upon recognition of the fault. The timing of the download may also be determined based upon the availability and quality of the data link 20 between the mobile asset and the data center 18.

The database 39 located at the data center 18 may also include data representing inspection reports 42, maintenance records 44, and design information 46 related to the specific vehicles included in the plurality of mobile assets. For example, if a truck 26 is brought to a service center 22 for a periodic inspection and maintenance visit, e.g., regarding its braking equipment, information regarding the results of the inspection and maintenance activities may be used to update the database 39 for that particular truck 26. The database may also be updated 39 if the designer of the mobile asset provides any revised design parameters 46, such as a new part number for an upgraded component. The quantity of data in such a data base may be immense when considering the number of vehicles in some fleets, and when considering the amount of data that may be collected on a periodic basis regarding the performance of each of the vehicles. However, the computing power of modern data processing equipment makes it relatively easy to analyze 48 such a database. Various data processing routines may be used to generate performance reports 50 regarding each of the individual assets or the fleet as an entirety. Statistical data 52 may be calculated to aid in the analysis of the operating parameters of the fleet.

Figure 8:
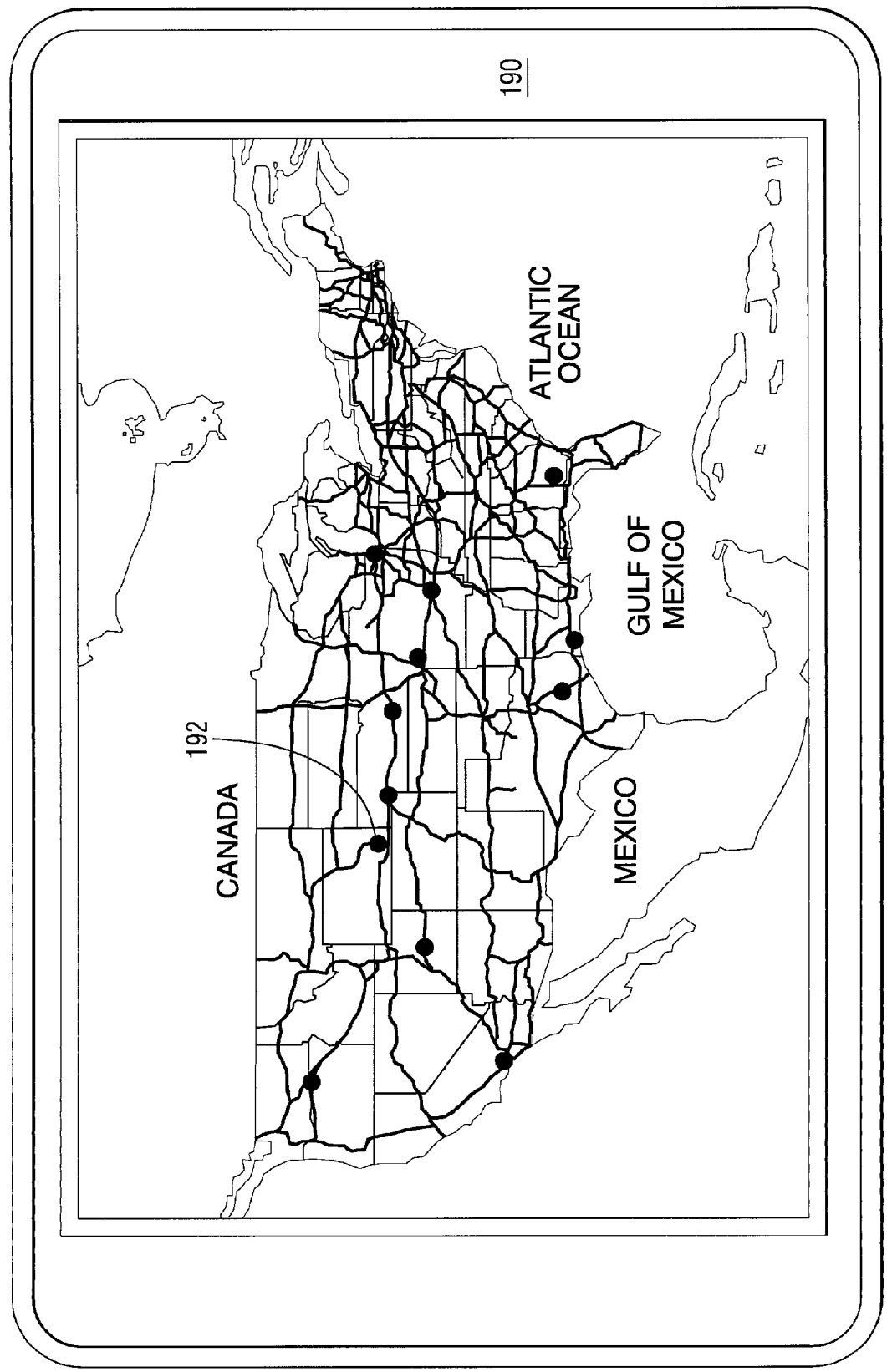
FIG. 8 illustrates a web page showing a route map for mobile assets.

In order to effectively utilize the vast amount of data that may be available regarding a fleet of mobile assets, the output of the analysis 48 of such data must be effectively displayed and conveyed to an interested user 14. As suggested above, there may be multiple users, e.g., users 14 and 24, interested in the data, and the level of detail of interest may vary from time to time. The inventors have found that an Internet web page is an effective means for communicating such data and information. An Internet web page may be updated 56 to reflect the performance reports 50, operating statistics 52, and/or current location map 54 for the fleet of mobile assets. One or more such web pages may be utilized with appropriate hyperlinks to additional web pages. By nesting related web pages, the level of detail presented to the user 14 may be controlled by that user. For example, a location map 190 of FIG. 8 illustrating the current geographic location of each of the assets owned by a rail transportation company may include a hyperlink 192 at the indication of the location of each of the locomotives 12. Such a map may also illustrate the location of service facilities. In the context of a fleet of trucks, a road map may be generated showing the location of each truck along with its route. By constructing such a map in a web site format, a hyperlink 192 may be provided on the map for each mobile asset to connect the user to an interconnected nested web page including additional information regarding that particular vehicle. For example, while the location of the mobile asset may be seen on map 190, by double clicking a cursor on the symbol for a single mobile asset, the speed, destination, route, cargo information, fuel level, driver information, and other operating information for that mobile asset may be viewed on nested web pages. One user, such as a customer 24 of the transportation company, may only be interested in the location of the truck. Another user 14, such as a service technician employed by the railroad, may be interested not only in the location of the locomotive but also in the amount of fuel on board or other operating parameter. Any such users, e.g., 14 or 24, can quickly obtain the information they need by a simple point and click operation using known Internet browser technology.

Known search engine software technology may be provided 70 to allow a user to identify desired information related to the mobile assets 12 via the global information network 15. Access to an appropriate web page including the desired information may then be provided via hyperlink directly from the search engine.

An Internet web page display used with the present invention may incorporate the full power of the multi-media capabilities of a global information network 15. For example, the location map 54 may include the use of color to indicate a readiness status for each mobile asset, for example, green for a properly functioning mobile asset, yellow for a mobile asset exhibiting an anomaly in one of its operating parameters, and red for a mobile asset having a critical fault. The user 14 of such information would be able to quickly assimilate a large volume of data and to have his/her attention directed to important portions of the data. Such a web page may also include links to additional pages including drawings of component parts, specifications, or operating and repair manuals or other design parameters 46. In some instances, it may be advantageous to include video information on such a web site, such as still or animated video produced by the operator of the locomotive and transmitted directly from the mobile asset to show the condition of a component. Such video information may be accompanied by live audio information, including speech from the operator, thereby allowing the user 14, the operator located on the mobile asset, and personnel at a service center 22 to conference regarding a developing anomaly. Communication over the global information network 15 using Internet Protocol allows packets of data to be communicated between different kinds of networks. The packets may consist of voice, text, video, audio or other types of data. The system 10 of FIG. 1 is adaptable to make use of future platforms as they become available.

When a critical fault is identified 38, or an anomaly is found to exist 58 in one or more of the operating parameters, a service recommendation may be developed 60. Information regarding the anomaly 58, critical fault 38, and/or service recommendation 60 may also be uploaded 56 to an Internet web page. When appropriate, a user may be notified 62 that new or urgent information has been displayed on the Internet web page. The user may be notified 62 by an electronic mail message, telephone call, fax or other simple form of communication. The user may then actively interact 68 with the web pages that present data regarding the mobile asset of interest. Such interaction may include a request by the user for additional information. Such a request would be transmitted to the operator of the mobile asset or other appropriate person via the global information network connection, and the response would be communicated in return.

The information available to the user on the Internet web page may also include information regarding services that are available 64 and/or a parts inventory 66 that may be important to any decision regarding a maintenance recommendation 60. Personnel located at a service center 22 may not only provide data for the user 14, but may also receive a communication from the user 14 regarding a planned maintenance activity, thereby facilitating the scheduling of maintenance activities at the service center 22.

One exemplary advantage of the data management system 10 of FIG. 1 and method 28 of FIG. 2 may be appreciated by considering a three locomotive train 12 operating in a relatively flat terrain on its way to a mountainous section of a rail line. Because the three locomotives are operating at reduced capacity along the flat terrain, the operator of the locomotives who may be physically sitting in the front locomotive may not be aware that a degraded condition has developed in the third locomotive. For example, a degraded cooling system may cause the third locomotive to throttle back to a reduced power output. Because the first and second locomotives are able to provide the necessary power, the progress of the train is unimpeded. Should this degraded condition continue to go unnoticed, the train would be unable to negotiate the mountainous terrain that it is approaching later in the journey. However, on-board sensors on the third locomotive identify the degraded cooling condition and data related to the degraded condition is immediately downloaded 40 to the data center 18 to update the data center database 38. Computers and/or personnel located at the data center 18 may analyze the data 48 and identify that the anomaly exists 58 and determine that a maintenance action 60 is recommended. For example, if a fan motor controller has developed a malfunction, a maintenance recommendation 60 to replace the control panel may be generated. A web page display showing the location of the locomotive would then be promptly updated 56 to show the degraded condition, and the railroad maintenance personnel are notified 62 by an electronic mail message that is automatically generated at the data center 18. The e-mail will include a Universal Resource Locator (URL) directing the maintenance personnel to an Internet web page including information regarding the degraded condition and the recommended maintenance activity. The maintenance personnel then view the available parts inventory 66 illustrated on another web page to verify the availability of the required control panel in a service center 22 located along the route of the locomotive 12. In this example, a user 14 is able to utilize the power of a global information network 15 web page presentation to quickly assess the importance of anomaly affecting one of a fleet of mobile assets and to assess various options for addressing such anomaly. For this example, the degraded locomotive may be repaired prior to the train becoming stalled on a mountainous section of the track, thereby avoiding a large out-of-pocket expense and a costly schedule delay for the transportation company. The speed of communication via the Internet and the breath of information that may be effectively communicated via an Internet web page make the system 10 of FIG. 1 and the method of managing assets 28 of FIG. 2 beneficial for a large fleet of mobile assets distributed over a large geographic area.

Access to an Internet web page including important information regarding a fleet of mobile assets may be restricted to only those users having appropriate authorization to access such data. For example, information derived from the analysis 48 of the data base may be displayed on a password protected Internet web page. Only authorized users, e.g., 14 or 24, would then be provided with the password necessary to gain access to the web page. Similarly, information received from a user and used to update the web page 56 may only be accepted as authentic if the user enters an appropriate password to confirm his/her identity. Other protection measures such as encrypting data may also be used. In some cases it may be desired to have at least a portion of the information displayed on an Internet web page be made publicly available. For example, it may be desirable to make the location map 54 for at least a portion of the mobile assets available for public viewing. In the case of a passenger and/or freight transportation company, the location of autobuses may be information that can be made available on a public Internet web page, whereas the location of freight trucks may be limited to only specific industrial customers of the transportation company.

Figure 3:
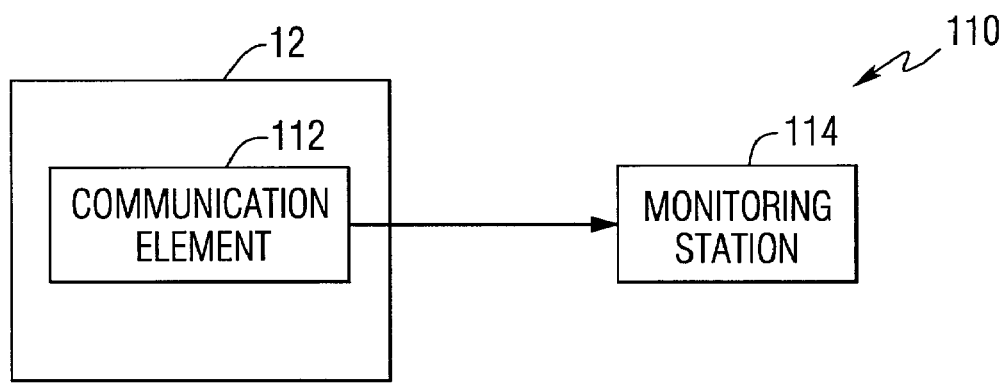
FIG. 3 is a block diagram of a system according to the invention for communicating data from a mobile asset.
Figure 4:
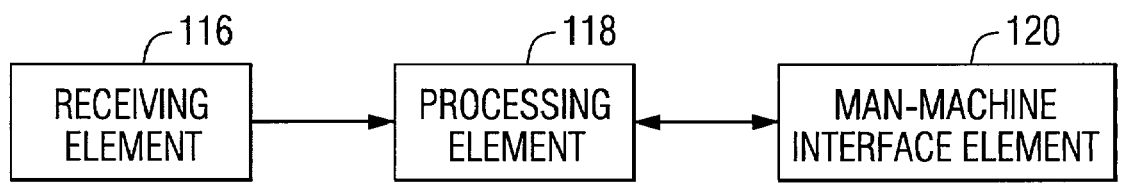
FIG. 4 is a block diagram of the monitoring station apparatus of the system shown in FIG. 3.

The present invention may further include a capability for predicting vehicle failure and for using such predictions to plan repair and maintenance work for each individual asset. One data is collected from the mobile assets, it may be used to develop a variety of types of information regarding the mobile assets. Such a capability includes monitoring on-board systems parameter data transmitted from each vehicle as it is operating; determining whether any of the monitored data is out of a predetermined range; calculating trends for monitored data determined to be out of range; identifying any system fault; predicting when such system is likely to fail unless corrected; and predicting which, if any, system must be corrected to avoid vehicle failure, developing a service recommendation, and communicating the service recommendation via a global information network. An apparatus to accomplish such steps is generally identified by numeral 110 of FIG. 3, and it comprises one or more communication elements 112 and a monitoring station 114. The communication element(s) 112 are carried by the remote vehicle, for example locomotive 12 or truck 26. The communication element(s) may comprise a cellular modem, a satellite transmitter or similar well-known means or methods for conveying wireless signals over long distances. Signals transmitted by communication element 112 are received by monitoring station 114 that, for example, may be the maintenance facility 22 or data center 18 of FIG. 1. Monitoring station 114 includes appropriate hardware and software for receiving and processing vehicle system parameter data signals generated by locomotive 12 or truck 26 from a remote location. Such equipment, as illustrated in block diagram form in FIG. 4, comprises receiving element 116, processing element 118, and man-machine interface element 120.

Examples of suitable receiving element 116 include a satellite communications receiver or cellular communications receiver. Processing element 118 may comprise a processor, memory and modem or Integrated Services Digital Network (ISDN) adapter of a conventional personal computer or workstation coupled with software capable of executing the functions represented in FIG. 4. Suitable processing element 118 may include a diagnostic system as described in U.S. Pat. No. 5,845,272. Man-machine interface element 120 may include a monitor, keyboard, mouse, printer and/or other related I/O devices for enabling interaction between a human operator and processing means 118. Monitored vehicle parameter data received by receiving means 116 is communicated to processing element 118 wherein it is processed in the manner shown in FIG. 5. It will be appreciated that in one exemplary embodiment, processing element 118 may be installed onboard the remote asset. In such embodiment, in lieu of transmitting raw data from the remote asset to the data center, the data will have been processed onboard by processing element 118. This embodiment would be less vulnerable to data link outages that may occur from time to time or data link data handling capacity. Further, such embodiment would allow for informing the operator in real time of any appropriate actions that the operator should take in connection with the operation of the mobile asset.

Many vehicle system operating parameters are monitored, and trends are calculated on a subset of those parameters, or on all of the parameters. Among the parameters which may be monitored for locomotives are ambient air temperature, train notch, total track and force power, total voltage, total amps, software versions, engine RPM, engine temperature, crankcase pressure, dynamic braking, battery voltage, and voltage and amperage for all auxiliary motors. For other vehicles, such as trucks, other sets of parameters may be monitored. In one exemplary embodiment, data that may be monitored may comprise data from the vehicle "control system", including onboard diagnostics (OBD), speedometer electronic output, brake state and other data feeds available from various vehicles subsystems. The monitored data may be used to determine a respective mobile asset "operating mode", as described in greater detail below. The monitored data may be accumulated or counted to determine the amount of time each respective mobile asset has been in any given operating mode, and to determine changes and severity level in the operational modes. Examples may include braking severity and severity of acceleration. Correction factors based on ambient conditions, such as temperature, humidity, etc., may be incorporated to more accurately calculate the most suitable operational mode to be assigned. The processing elements may be configured to provide data useful to determine maintenance actions appropriate to the actual operational conditions of any given asset. Examples of the processing of such condition-based data may include respective data processing routines for determining: remaining life of oil, filters, rings, engine, brakes, etc. Other applications may include determining OEM used vehicle certification criteria, supporting insurance actuarial modifications, etc.

One exemplary matrix for determining the operational mode of the mobile asset may be as illustrated in Table 1, wherein a steady state condition may correspond to meeting a respective set of rules, such as the following exemplary set of rules:

Steady State=Stable engine block temperature, e.g., inferred from oil temperature, Time of operation and ambient conditions for applicable vehicle model; and/or Stable Coolant Temperature; & Not braking; & Not Accelerating; & Not Shifting; & Not Climbing or descending It should be noted that in the general case, each operational mode may be derived from a multi-dimensional matrix. For simplicity of illustration, in Table 1, only a first dimension is listed. Other dimensions may comprise ambient conditions, engine temperature state, vehicle weight, vehicular load including wind and incline. For example a vehicle may be in the state Accelerate Lo/Up steep hill/into headwind/hot ambient/hot engine, which may indicate a life consumption adjusting factor on the oil of ten times normal depletion, e.g., as compared to depletion in an ideal steady state cruising. The adjusting factors may be experimentally and/or empirically determined in combination with oil analyses, dynamometer measurements, engine and vehicle models. Table 2 illustrates exemplary operational modes that may be accumulated to determine the actual historical usage of the vehicle.

TABLE 1

Vehicle Operating Modes

| Vehicle Mode | Vehicle Condition | M&D Integer Mode Value |
| --- | --- | --- |
| OFF/Unknown | Transient | 0 |
| Idle | Transient | 1 |
| Accelerate-LO | Transient | 2 |
| Accelerate-HI | Transient | 3 |
| Braking-HI | Transient | 4 |
| Braking-LO | Transient | 5 |
| Idle with Aux. | Transient | 6 |
| Low Speed | Transient | 7 |
| Medium Speed | Transient | 8 |
| High Speed | Transient | 9 |
| High Speed Climbing | Transient | 10 |
| Descending | Transient | 11 |
| High Torque | Transient | 12 |
| Idle with Aux. | Steady State | 13 |
| Low Speed | Steady State | 14 |
| Medium Speed | Steady State | 15 |
| High Speed | Steady State | 16 |
| High Speed Climbing | Steady State | 17 |
| Descending | Steady State | 18 |
| High Torque | Steady State | 19 |

TABLE 2

Actual Mobile Asset Usage History
Vehicle Usage History

Starts

Normal
Cold
Hot
Stalls

TABLE 2-continued

Actual Mobile Asset Usage History
Vehicle Usage History

Load Cycles

Day, Night
Weekend Usage
Hours

City Driving
Idle Time
Highway
High Torque
Seasons

Winter vs. Summer

Figure 5:
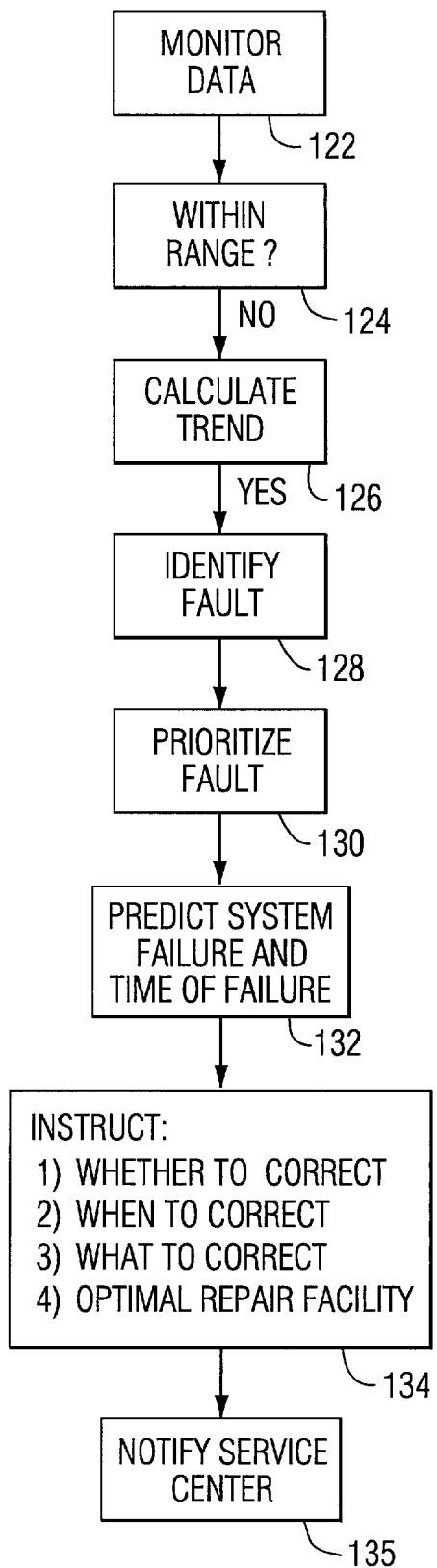
FIG. 5 is a block diagram of a vehicle maintenance management method.

Referring to FIG. 5, there is shown a block diagram of the operations performed by processing element 118 upon receipt of vehicle systems parameter data transmitted by communication element 112. As suggested above, some embodiments may allow for performing most or all of such processing onboard the mobile asset. Upon issuance of a transmission request from monitoring station 114, communication element 112 preferably continuously transmits the data and receiving element 116 preferably continuously receives the data. Using receiving element 116, processing element 118 monitors the data as indicated at 122. A first determination 124 made by processing element 118 is whether any of the data is outside of an acceptable range for any of the vehicle systems being monitored. If the processing element identifies out-of-range data, it executes a routine 126 to calculate whether the data suggests one or more trends suggestive of possible or actual impairment or failure of the vehicle systems being monitored.

The trends are calculated by comparing values for a given parameter over a period of time and comparing those values with historical data for identical vehicle systems. This enables rapid and accurate correlation of trending data with a dedicated fault occurrence experience database. The trends are preferably calculated based in part on prior downloads collected in the database. The database is preferably continually updated and may be stored in the memory of processing element 118, elsewhere at the monitoring station 114, or off-site whereby it may be accessed on-line.

An example of a trend that may indicate a system fault would be a crankcase overpressure trend from negative to positive. Such a condition may be suggestive of a cylinder or piston problem or excessive engine wear. Processing element 118 is preferably capable of linking the results of several observed trends to more precisely diagnose a problem. For instance, the aforementioned crankcase overpressure trend may be coupled by processing element 118 with an observed trend in electronic fuel injection parameters to more clearly determine the cause of the problem.

Once an unfavorable trend is detected, it is identified by processing element 118 with a stored fault code as indicated at 128. Fault codes corresponding to a wide variety of faults may be stored, and trends may be calculated for some or all of them. Examples of faults that may be categorized include, without limitation, overcurrents, flashovers, crankcase overtemperatures, crankcase overpressures, communication failures, electrical ground failures, air conditioner converter failures, propulsion system faults, auxiliary system faults, propulsion motor faults, auxiliary motor faults, auxiliary system charging faults, engine cooling system faults, oil system faults, control wiring faults, and microelectronics faults.

As indicated at 130, following identification and categorization of a fault, processing element 118 then prioritizes the fault. The fault prioritization process involves comparing the identified fault code with a historical fault database whereby the fault may be classified as critical, restrictive, or both critical and restrictive. A critical fault is one that will cause imminent vehicle shutdown if not immediately corrected. Examples include, without limitation, serious engine problems, main and auxiliary alternator grounds, coolant or oil pressure loss and microelectronics failures. A restrictive fault is one that, although not likely to cause imminent vehicle shutdown, impedes vehicle performance. A restrictive fault is likely to become progressively worse and may degenerate into a critical fault if not timely addressed. Examples of restrictive faults include, without limitation, an overheated engine or the loss of one or more cylinders, each of which deplete horsepower and may cause other strain on the engine or other systems of the vehicle.

After a fault has been prioritized, processing element 118, as indicated at 132, predicts which vehicle system is likely to fail. Additionally, processing element also predicts the estimated time of failure, preferably expressed as an approximation of the distance (in miles or kilometers, for example) the vehicle can be safely operated before it must be shopped prior to failure or the amount of operating time prior to failure. The optimum time the vehicle should be shopped is determined by resorting to the relevant trend data for the identified fault and comparing that data with a projected time-of-failure knowledge base which has been inputted into the database for the calculation.

As indicated at 134, processing element 118 is also preferably programmed to instruct a human operator at monitoring station 114: (1) whether to correct the fault prior to scheduled maintenance of the vehicle, (2) when to correct the fault, (3) what fault to correct (preferably including what parts or components of the vehicle to repair), and (4) the optimal facility at which to correct the fault. The optimal repair facility is dependent upon the proximity of the vehicle to a facility and whether the facility has the capability, including parts, service equipment and personnel expertise necessary to repair the fault. Personnel at the service center are alerted to the planned arrival of the mobile asset at step 135.

The data monitored at step 122 may include data regarding the cargo 25 being transported by a mobile asset 16. Such data may be used to develop information regarding the cargo, and such information may be distributed via the global information network 15. A web site may be developed including information of interest to the owners of the cargo 25, such as the location of the cargo, and such owners may be provided access to the respective web pages via secured or unsecured web access via the global information network 25. A route map such as is illustrated in FIG. 8 may be posted on the global information network 15 to illustrate the location of various cargo loads. Two-way communication may be provided between a controller 24 for the operation of the mobile assets 16 and the owners 14 of the cargo 25.

Figure 6:
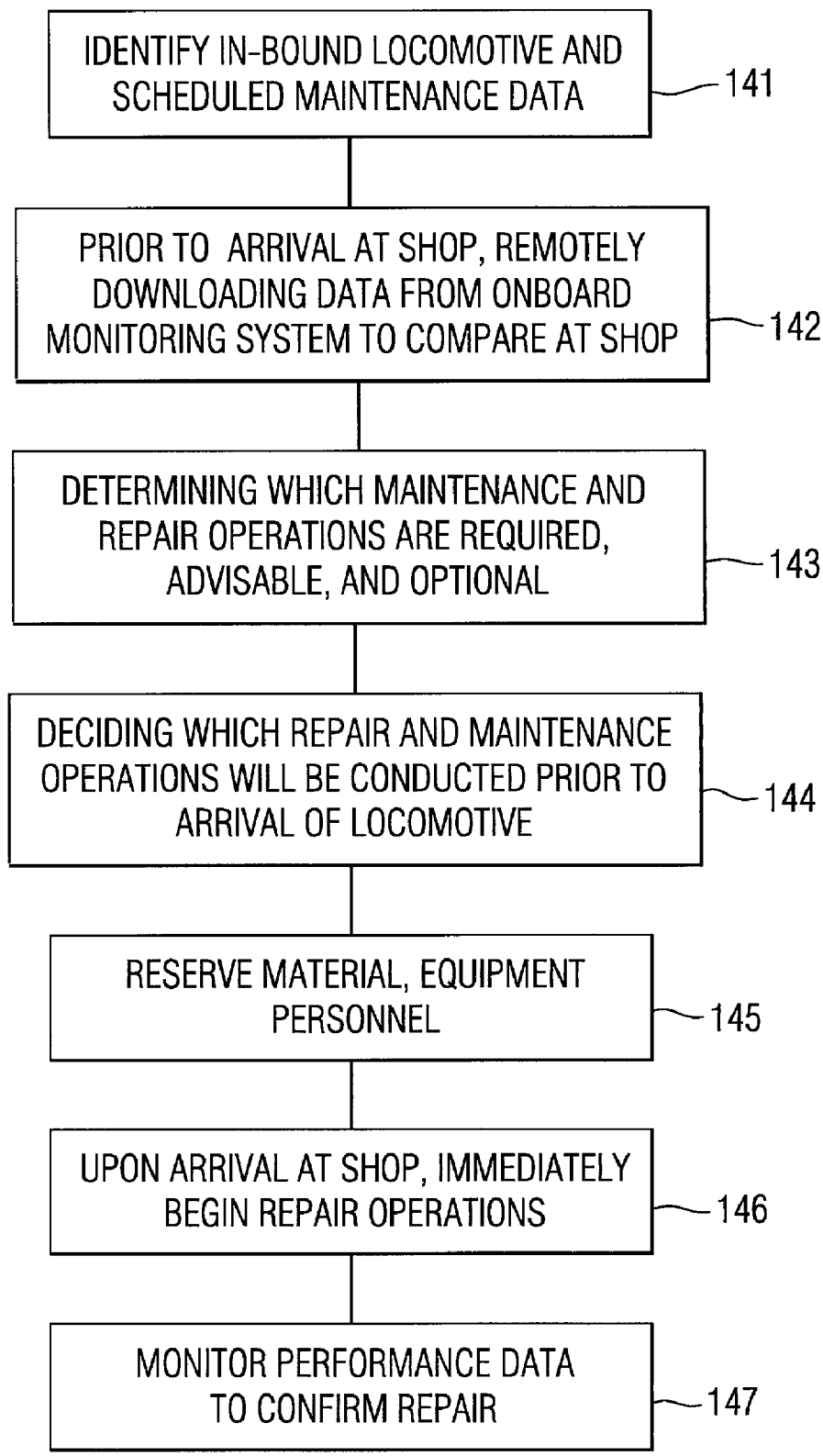
FIG. 6 is a block diagram of a system for conducting a remote inbound inspection of locomotives.

The apparatus and method of the present invention may also include improvements in the processing of a mobile asset through the repair facility 22 of FIG. 1 when maintenance/repairs are necessary. FIG. 6 illustrates in block diagram form a system for performing an inspection of a remote inbound vehicle, and for planning the maintenance/repair activities on that vehicle before it arrives at a service location. Such a process begins by identifying an inbound mobile asset, such as a locomotive 12, and its scheduled maintenance date 141. The maintenance schedule may be maintained on a computer in the service center 22 or at any other convenient location accessible through the global information network 15 of FIG. 1. Prior to arrival at the shop, a signal is sent to the communication element 112 of FIG. 3, such as an on-board computer, and instructs it to transmit data on all monitored parameters 142. The service personnel and service center computer have access to a vast amount of historical and experiential data pertaining to the systems used in various locomotive models, and they use such data according to an algorithm to determine which maintenance and repair operations are required, advisable, and optional 143 for the particular inbound locomotive. A report is generated and sent to the owner of the asset, such as via an Internet web page, to identify such operations while the vehicle is still inbound. Decisions 144 are made as to which of the advisable and optional maintenance operations will be performed when the vehicle arrives at the shop. Maintenance personnel may then begin preparations for the repair activities 145 prior to the mobile asset arriving at the repair facility. The system envisions beginning repair operations 146 immediately upon arrival of the asset 12 at the service location 22, obviating the requirement of a time-consuming inspection and decision-making process after arrival in the shop. Information regarding the status of a service activity may also be distributed via the global information network.15. Once a repair is completed and the vehicle is returned to service, performance data may again be monitored 147 to conform a satisfactory completion of the service activity, and information regarding the satisfactory completion may be distributed via the global information network.

The step 143 of determining which operations are recommended may include the analysis process illustrated in FIG. 5. Trends are calculated 126 by comparing values for a given parameter over a period of time and comparing those values with historical data for identical vehicle systems. This enables rapid and accurate correlation of trending data with a dedicated fault occurrence experience database. The trends are preferably calculated based in part on prior operating data that has been downloaded and collected in the database. The database is preferably continually updated and may be stored in the memory of the shop computer or off-site at data center 18 where it may be accessed on-line via the network 15 of FIG. 1.

The present invention enables service personnel to reliably and quickly retrieve a vast amount of archived information directly onto the job floor, either via a kiosk 21 located within the service facility 22 and/or with portable hand-held communication and display units 23 that the service personnel can take with them right to the locomotive 12. Such data portals 21,23 may communicate to a central computer via electromagnetic signals, such as RF signals, or on-line via the Internet or via an intranet of the service provider. The data portals advantageously display the information directly at the work site location. It will be appreciated that the present invention contemplates the use of mobile wireless, web-access devices that could directly access the intranet of the service provider.

Electronic Service Delivery (E-izing) as contemplated by the present invention is a broad term used to describe the result of many applications to be utilized at a service application site 22. It involves streamlining and standardizing multiple servicing processes, as well as providing the users with all the information they need to maintain and repair a product on location. A first data portal may be a kiosk 21, e.g., a PC-based information stand that contains all the technical and safety information that is currently available in hard copy. Information is made conveniently available at the click of mouse, the touch of a screen, a voice command, etc. A second portal may be a handheld device 23 that could utilize the kiosk 21 as its hub and may be used for displaying real time information relevant to the tasks involved in inspecting and repairing the product 12. The present invention may further enable the display of service-related information on a monitoring board to allow service personnel to quickly and accurately know on a real time basis the status of every piece of equipment being serviced at the service site 22 or at other sites. By way of example, the information transmitted through each of these portals 21,23 may be technical information available in hard copy but enhanced through suitable multimedia applications, such as audio and/or visual drill downs, and/or wizard applications that empower the service personnel to make uniformly correct decision across all the service sites.

The electronic data delivery system of the present invention allows for improving field service operations by applying e-Business technologies to replace manual paper based processes. The business benefit will include improved availability of the asset by reducing the cycle time of the repairs and to have higher quality repairs. In addition, other processes, such as inventory management, will be improved to have the correct part available when needed.

Figure 7:
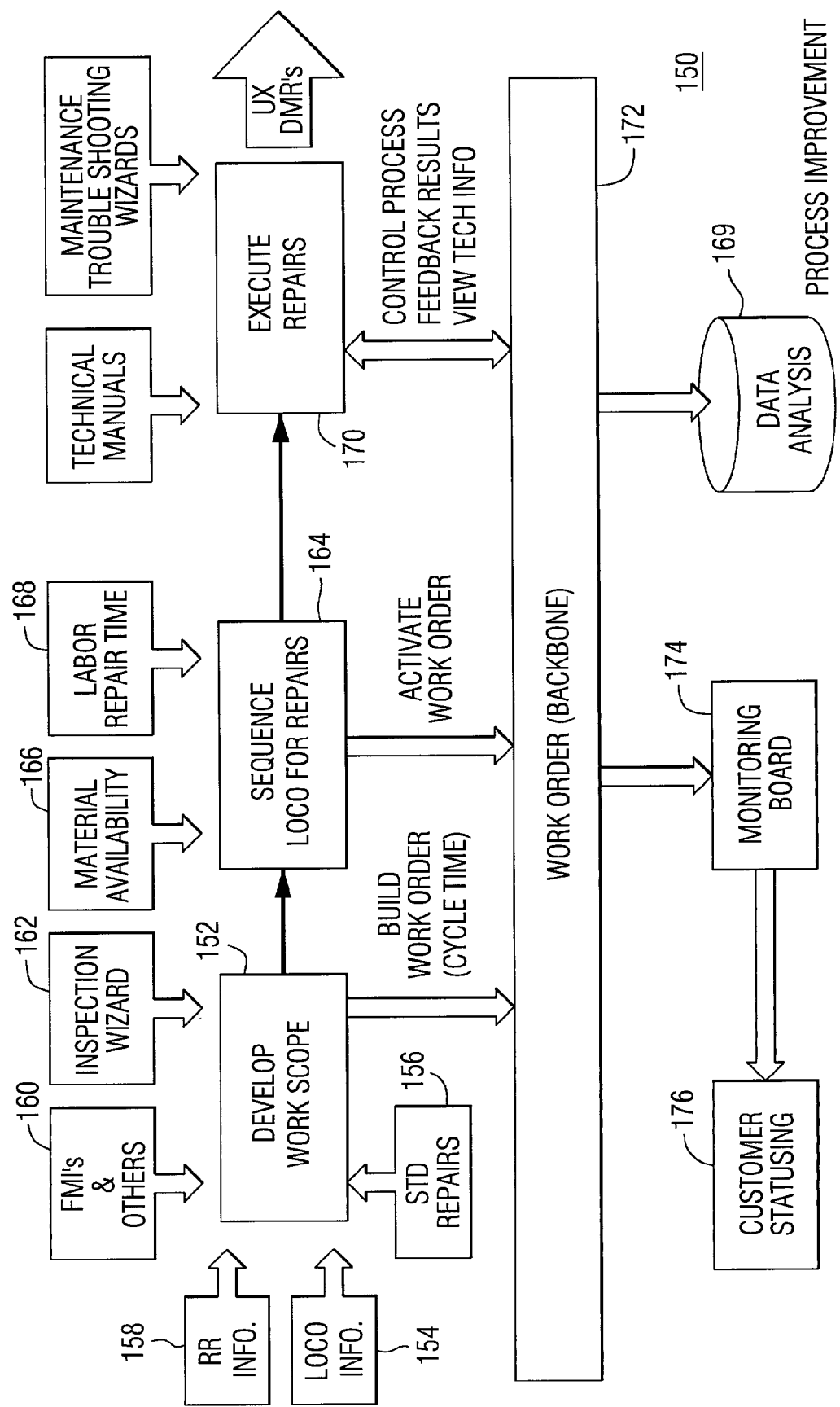
FIG. 7 illustrates an apparatus and method for generating work orders.

As shown in FIG. 7, a work order flow module 150 is used to control the various repair processes. One exemplary step or action is to develop an accurate work scope 152 in response to a service recommendation, such as is developed at step 143 of FIG. 6. Information will be electronically accumulated to develop the work scope, and at least part of this information may be communicated via the global information network 15 as illustrated in FIG. 1. By way of example and not of limitation, the information may include the following: performance information from the product 154, repair history information 156, information from the customer 158, required and optional repairs 160, and information learned during inspection 162.

The next step is to use the work scope to determine the sequence of repairs 164 based on customer need 158, materials availability 166, and resource availability 168, and drawing upon customized or standard work steps stored in a data warehouse 169. The process will provide service personnel with the information needed to determine the order of repairs and to communicate to the craft workforce.

The execution of the repairs will take place 170 by directing the worker via the data portal 21,23. The work order 172 provided to the worker via the data portal will direct the worker through each repair that is needed. The completion of each step is recorded via the data portal to update the data warehouse 169 and to provide real-time repair status information via a monitoring board 174. A feedback loop will be used to update the current production configuration. The work order 172 will provide a more controlled and accurate repair process.

The information obtained from the work order completions will allow for monitoring the status of the repairs and will also allow customers 176 to get real-time status of their product in the repair cycle. The data will also be used to improve reliability of the product and to compare and improve field shop processes across field sites. Communication of such information can be efficiently accomplished via the global information network 15 of FIG. 1.

In operation, consider a scenario of how the present invention improves productivity and performance in a plurality of locomotive fleets by leveraging advanced communication, diagnostic, scheduling, data handling and locomotive repair technologies, thereby increasing train on time and up time. Envision a train operating along a rail route. Diagnostic modules are regularly monitoring the various subsystems of the locomotive to ensure operations stay within set parameters. For example, the onboard system may be configured to maintain optimal fluid conditions to maximize oil life without sacrificing either engine reliability or locomotive performance. If the onboard monitor recognizes trends outside predefined limits, the fluids management system highlights the abnormality on the locomotive indicating a potential concern. Based on the severity of the concern, the system may automatically call the remote diagnostics service center with the necessary data to confirm the diagnosis. Expert systems and/or expert personnel evaluate whether a faulty condition is developing outside of the normal boundaries and a corrective action may be proposed and communicated via a global information network. The recommended action may be supplied directly into the train control system. At this time, the data center or service personnel may evaluate the most logical repair location in terms of various criteria, such as train proximity, parts, repair equipment availability, manpower availability, etc. The service recommendation automatically triggers the creation of an electronic work order 172 within a service shop management system. A notification is then sent, such as via an e-mail message or by providing information on an Internet web page, to the service team detailing the parts and labor necessary for a timely and accurate repair.

The recommendation also sets a proximity trigger to notify the service shop when the locomotive is within a certain distance of the repair location. As soon as the service team receives information about the necessary repair, team members gather or reserve the parts, equipment and personnel needed to perform the corrective action 145. The approaching locomotive may automatically forward a notification message to the service repair shop indicating that it is approaching. Alternatively, the service personnel may utilize a search engine 70 to identify the proximity of locomotives to their respective service shop. An example of a web page presenting such information is shown in FIG. 9. A hyperlink may be provided on this screen to connect the user with nested web pages showing more detailed information regarding a particular locomotive. Upon arrival of the train to the scheduled repair station, the locomotive is repaired by a service technician equipped with the necessary parts and the wireless handheld device 23 that contains the appropriate maintenance, safety and training instructions for the repair to be accomplished safely, quickly and accurately. Furthermore, plans may be made in advance of the train arriving at the service shop for the continued transportation of the cargo being transported by the train, thereby avoiding excessive delays in cargo delivery.

The service technician informs the service shop management system that the operation has been completed. The train continues on its route without delay. During its journey, the technology service center monitors the latest downloaded data 147 to ensure the problem has been corrected.

Figure 10:
FIGS. 10-12 illustrate exemplary pages from a web site including information related to the management of a fleet of locomotives.
Figure 11:
Figure 12:

The global information network 15 facilitates the effective communication of many forms of information for improving the management of a plurality of mobile assets, e.g., 12 or 26. A web site accessible through the global information network 15 and using standard Internet Protocol can present information in a variety of formats to satisfy the unique requirements of a variety of users. Such information may include failure predictions, service recommendations, the availability of service shops 22, parts and personnel, the location of a mobile asset or its cargo 25, performance data, audio and video information produced on-board the mobile asset, two-way communication between a mobile asset and a fixed remote location 14,18,22,24, statistical information regarding the availability of the assets, repair status information, etc. It will be appreciated that the present invention need not be limited to fixed remote locations since in some instances some aspects of the management of the fleet could be conducted from a mobile asset itself, such as a mobile data management trailer and the like. Web site technology, including interconnected web pages and hyperlink connectivity, may be used to present multi-media information. Example web pages from a web site created as part of the system 10 of FIG. 1 are illustrated in FIGS. 10-12. FIG. 10 illustrates an exemplary web page 200 providing hyperlinks to a variety of design documents for a locomotive. One such hyperlink 202 takes the user to an interconnected page having a specific troubleshooting guide. That page is illustrated in FIG. 11. Web page 200 also includes the capability for the user to conduct a search, such as by inputting a specific vehicle number 204. FIG. 12 illustrates another web page 210 whereby best practices are shared by the posting of messages by various users. Here, again, various search capabilities are provided 212 to enable the user to use the information effectively, and various hyperlinks 214 provide easy connections to other associated web pages and functions. As bandwidth capabilities increase and become less expensive, the benefits of the disclosed invention will become even more important.

Figure 13:
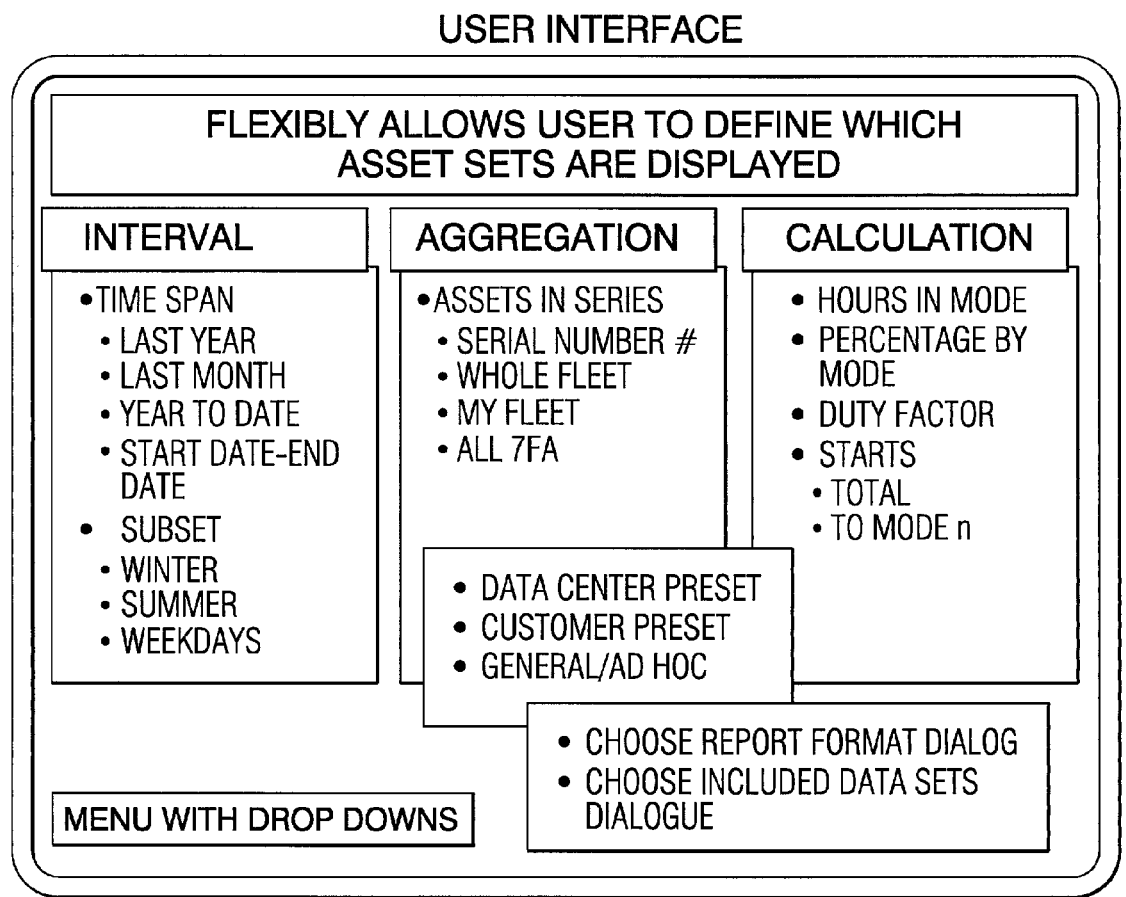
FIG. 13 illustrates an exemplary web page that may be used for meeting a contractual obligation to report out on usage of a fleet of trucks.
Figure 14:
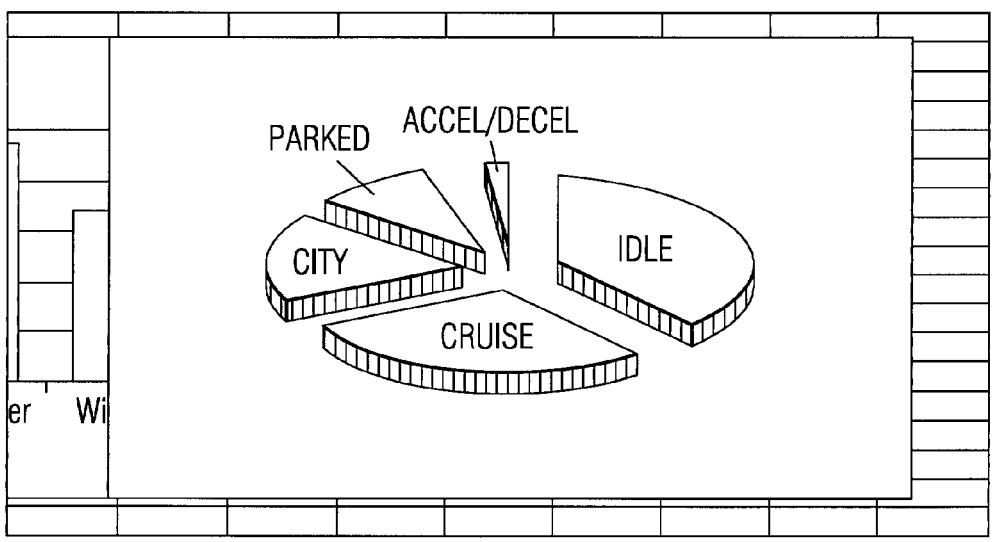
FIG. 14 illustrates an exemplary "pie chart" plot that indicates the amount of time a given set of mobile assets may have spent in respective operational modes indicative of a respective state of health of the assets.

FIG. 13 shows an exemplary web page that may be used for meeting a contractual obligation to report out on usage, e.g., seasonal usage, of a fleet of mobile assets. The user logs into a profiler web site with an appropriately authorized password and identification code. The graphical user interface (GUI) is configurable to flexibly allow for making various comparisons of actual usage of the fleet of mobile assets. For example, the comparisons may be default comparisons set by the data center, or may be based on comparison requests set by the user and may accommodate general or Ad Hoc comparison requests. The user may choose from an interval menu to choose the time span to be displayed, e.g., fleet data based on last year usage for a given site, or the time span may comprise the last ten years of fleet data. If desired, the user may select from an interval subset menu and select various comparisons, e.g., seasonal comparisons, summer, winter, fall, spring, or other criteria, such as weekdays, weekends. The user may also choose from an aggregation menu to choose multiple comparisons as a function of mobile asset number, or fleet number or any other criteria helpful to that user. For example, the user may be authorized to monitor only a fleet under her managerial responsibility but may not be authorized to monitor fleets operated by other fleet managers. The user may also selects calculation of a duty factor that may be defined as percentage of available output made during the interval. Upon completion of the selections, the profiler web site generates a plot and/or report, as customized by the user. FIG. 14 illustrates an exemplary "pie chart" plot that indicates the amount of time a given set of mobile assets may have spend in respective operational modes, such as city driving, highway driving, idling, parked, cruising, accelerating, decelerating, loaded, unloaded, braking, hot weather, cold weather, etc.

Below are listed various exemplary embodiments that may be particularly suitable for on-road vehicles, such a fleet of trucks, autobuses, taxi cabs, etc. In one exemplary embodiment, the system would include a display device configured to display a routing for the driver that identifies which locations to stop at for "refueling" of the vehicle. The routing would identify the respective locations applicable to the route being driven by the driver for a given opportunity. The refueling could simply involve those locations which have a competitive contract price per gallon for fuel.

In another exemplary embodiment, the system would include a diagnostics routine that would help prevent air brake inspection failures. As will be appreciated by those skilled in the art, air brake inspection failures is believed to be the leading source of DOT fines involving commercial vehicles. Thus, this routine would indicate the wearing of disc pads and linings. By using standard sensor devices, it would also provide information on the air pressure level in the air lines and air-compressing equipment. It would also indicate when the brake cable is no longer functioning.

In still another exemplary embodiment, incentives or awards, conceptually analogous to "Frequent Filler Miles", may be issued to the drivers to entice such drivers to come to preferred service stations and give them frequent filler miles toward personal vacations, awards (discounted air line tickets, hotel, etc.). The service station would be equipped with a suitable wireless data transfer device so that when the truck pulls up to the pump station, the diagnostic information would be uploaded to the central computer. It is contemplated that the truck tires may be positioned to rest on an optical tire-wear reader which records tire wear and inflation. In case of inadequate inflation and/or excessive tire wear, the diagnostic routine would provide in real time corrective actions to the operator and possibly avoid a road failure. It is further contemplated that the truck may be fitted with a quick oil connection which allows flow of oil to suitable oil viscosity and quality measuring devices, before the operator shuts off the engine. Similarly, information about idle performance may be recorded while the truck is being refueled.

It will be appreciated that the system and techniques of the present invention would allow for enhanced "On-Time" delivery service. This service is now achievable by accurately determining and coordinating GPS-based locations for truck and rail interactions to improve load and/or driver hand-offs and schedules, especially when they may have been some delays due to force majeure events.

It is believed that the system and techniques of the present invention may allow the OEM to issue extended warranties for the mobile assets. For example, assuming the operator of the asset is in compliance with the condition-based service and monitoring and diagnostics services, the warranty period may be extended to, for example, up to three times the standard mile coverage. Further, the users of the vehicle may now have the ability to operate their vehicle in previously non-attainable zones because of the enhanced operational characteristics derived from having clean air filters, oil with proper lubricity, well-tuned engine, etc., due to the condition-driven maintenance. It is believed that in some sport utility vehicles, a 35% improvement in fuel consumption may be achieved as a result of such condition-driven maintenance. It is believed that vehicular leasing companies may greatly benefit from the various aspects of the present invention.

It is contemplated that the system may further include hardware and software configured to provide profile-driven marketing to users of the vehicles. Such marketing may take advantage of smart private-label credit or debit cards as an exemplary medium to store coupons, incentives and other marketing benefits. Tracking of utilization of the vehicle and utilization of the related credit card and generated bonus "gifts" incentives and discounts either in conjunction with using fleet purchasing agreements or simply taking advantage of private advertising which may produce direct revenue for the respective business entities that operate the respective fleets of mobile assets. Examples of such profile-driven incentives may be as follows: A map appears at the time of night when a given driver usually eats dinner. The map may provide directions to a restaurant near the fleet fuel depot where that driver can get a free dessert with her dinner purchase. Utilization of the coupon results in a transaction fee to the entity. Fueling at the depot results in a bonus to the entity. Data is collected to better target the incentives. For example, the data center may have been previously informed that a given driver is member of the American Automobile Association (AAA) and the data center may automatically deliver to that driver a list of AAA discount hotels when that driver is on route to visit grandma.

As suggested above, in one aspect of the present invention, the actual mobile asset usage history may be based on a plurality of measured and or calculated parameters. Table 3 below provides an exemplary list of such parameters.

TABLE 3

Actual Mobile Asset Usage History

Measured Parameters

Starts - (e.g., Normal, Cold, Hot, Stalls)
Hours - (e.g., City, Idle, Highway, High Load)
Load Cycles - (e.g., Day, Night, Weekend)
Speed - (e.g., Engine, Vehicle)
Braking - (e.g., Number of Times, Force)
Environment - (e.g., Temperature, Barometer, Location, Elevation, Weather Climbing/Downhill)
Engine Parameters - (e.g., Temperature, Oil Pressure, Voltage/Amperage)
Fault Logs
Mileage - (e.g., Trip, Total)
Calculated Parameters Acceleration
Deceleration/Braking Level
Instantaneous/Cumulative Fuel Use
(e.g., Per Hour, Per Driver, Per Mile)

In another aspect of the present invention, trending history may be used for estimating the time before a road failure occurs. Table 4 below lists exemplary criteria that may be used for using the trending history of the mobile asset.

TABLE 4

Trending/History

Trend measured and derived values to predict faults
Time under load - (e.g., Low, Medium, High Load)
Time used when not properly maintained
Time used when condition-based maintenance is used In another aspect of the present invention, the maintenance history of each mobile asset as exemplarily listed in Table 5 is reliably and quickly made available to authorized remote users for a multiplicity of uses as exemplarily listed in Table 6 below.

TABLE 5

Exemplary Maintenance/Service History

Fuel
Oil Change/Filters
Repair, e.g., brake repair, engine repair
Diagnostics for Faults/Repairs
Prognostics for Anticipated Faults

TABLE 6

Exemplary Uses of Information

Insurance
Identity Bad Actors/Repeat Offender for Repairs/Maintenance
Asset management
Resale of asset
Maintenance planning
DOT compliance TABLE 6-continued Exemplary Uses of Information Condition-based maintenance
Asset history to evaluate needed repairs
Ordering parts and components for repairs
Tracking of vehicles and freight
Service contracts performance
Warranty claims
Leasing contracts
Better knowledge of Lease Residual Value In another aspect of the invention, various data may be timely and reliably communicated to distinct users generally remote from one another to greatly facilitate management of a fleet of remote assets. Table 7 below provides various exemplary actions that are greatly facilitated by the present invention.

TABLE 7

Remote monitoring

Asset Management
Instructions for Repair
(Nearest recommended repair/facility)
Remote Lock/Unlock/Prevention of Starting
Text, video and audio to driver In yet another aspect of the invention, onboard processing of data may be conducted to facilitate communication of data from the mobile asset to the data center. Examples of such on-board data processing are illustrated in Table 8 below.

TABLE 8

On-Board Data Reduction (Calculations/Trends/Fault Reporting/
Selective Data/Request only data, Vehicle
Set Points (Speed Governors))

As suggested above, condition-based dynamic maintenance planning and the utilization of such dynamic maintenance planning allows for better assessing the residual value of the mobile asset. In general, such condition-based maintenance planning allows for establishing a cost/benefit evaluation of the mobile asset for a proposed future plan of use in light of the state of health of the mobile asset. For example, assuming the mobile asset is leased, then at the time of expiration of the lease, it would be useful to the OEM to know for each mobile asset how that individual asset was operated and maintained. If the asset was appropriately maintained, even though the asset was heavily used, then the residual value of that asset may be comparable or higher than the residual value of another asset with more moderate use but lacking a fully compliant maintenance program. Another potential aspect would be the utilization of such dynamic maintenance plan to manage aggregate purchase agreements. For example, automatically instructing the driver to have the mobile asset serviced at a particular preferred service shop, part of a chain of service shops, with which the fleet operator has previously negotiated preferred discount rates.

Mobile Assets Information Services

In another aspect of the present invention, the fleet data management tools of the present invention allow for providing enhanced services in connection with the fleet of remote assets by:

Enhancing residual value of the asset by retrofitting data collection and processing devices to provide various data management services Enhance initial value of the asset by inclusion of such devices as original equipment As suggested above, such data management services may include some or all of the following services:

1. Electronic and remote hosting of computer-readable maintenance records in support of compliance with governmental agencies, e.g., Department of Transportation (DOT), condition based maintenance planning, historical asset utilization
2. Usage profiling, such as may provided by accurately determining actual usage of any individual asset, e.g., monitoring, as a function of time, available control system data such as tachometer, odometer, fuel flow, and/or environmental parameters such as temperature, altitude, humidity, etc. The usage profiling may be performed in conjunction with host data archival services used in support of various processes encountered during the operation of the fleet of assets, such as fleet maintenance scheduling, engine optimization for fuel efficiency, compliance of driver sleep and/or speed requirements, logistics planning and may include information from terrain and/or weather maps where the vehicle has traveled.
3. Value added services based on some or all of the preceding stored knowledge, with or without the assistance of processing or expert systems that may be developed in conjunction with the gathering of historical performance data to establish data-driven signatures or triggers for maintenance escalation.
4. Such systems may include:
   Storing onboard and/or off board engine or other subsystem related models
   trending of measured and derived parameters and comparison to expected values to indicate anomalous conditions
   Exceeding dynamically calculated maintenance intervals for use in operational changes
   Scheduling maintenance and/or Pre-ordering needed parts for remediation and improvement.
   Maintenance plans optimized for the fleet as opposed to just a single vehicle.
5. Non-maintenance related information services may include some or all of the following:
   Use of position and usage information in support of logistics both track and trace and match load requirements
   Interaction with aggregate purchase agreements to direct equipment operators to outlets for the covered material
   Virtual real time data messaging to/from driver
6. Basic remote control of remote assets via secure communication such as
   Locking or unlocking of access doors/windows
   Preventing vehicle start
7. It is contemplated that such services could be provided as stand alone service contracts in association with purchase of enabling retrofit of already deployed assets or in connection with deployment of new models. Alternatively such services could be provided as part of contract service agreements or in conjunction with delivery of performance guarantees and full scope leasing arrangements. In one exemplary embodiment, the assignee of the present invention may advantageously leverage domain knowledge created through its GE Fleet Services or in connection with commercially available leasing services, e.g., Penske Truck leasing, to create a business process to be electronically-enabled for application in private fleet garages.

In operation, the system and techniques of the present invention are believed to provide the following:

1) A combination of devices performing data concentration, data communications, data reduction, data processing, archival and marketing to provide the following:
   Data acquisition onboard of mobile assets to gather, store and preprocess data from the electronic control systems, additional sensors (GPS, ambient conditions and others), and accessory subsystems such as "cherry pickers" or drilling rigs.
   Such system to be remotely upgradable in software and/or diagnostic algorithm tuning parameters
   Such system to support modifications of controls set points such as governor settings based on central or distributed decision making by experts or the system itself.
   Such data processing configured to identify anomalous conditions that may require escalation and communication either through annunciation in the cab, remote real time communications or periodic data dumps at properly designated way points
   Communications capabilities with on board real time system using GPS, cell phones, satellite-based communications, etc.
   Radio Frequency (RF) (both long and short range), Infrared (IR) for wireless communications at way points (during fueling for example)
   Wired functionality at service shops
   Remote data center or centers aggregating data, processed data, fleet information, dynamically revised models and anomaly triggers, off board expert systems
   To create operations and maintenance action recommendations to be communicated through, phone, pager, e-mail or other feedback systems including direct interaction with the data concentrator or its communications modules
2) It is believed that the system and techniques of the present invention allow the assignee of the present invention to provide more timely and cost effective services for managing a fleet of remote assets, including leasing of a fleet of mobile assets by providing the following:
   Improved driver satisfaction and compliance of maintenance of the asset which directly improves the residual value of the asset,
   More robust aggregate purchase agreements because timely delivery of fleet-related data allows for more effective use of such purchase agreements,
   new services such as freight or mobile asset tracking and utilization advice,
   broader reach to non-GE service shops through sharing of advantageous GE business practices
   offering of performance guarantees based on estimated cost of operation per mile including cost of fuel and tires.

The present invention can be embodied in the form of computer-implemented processes and apparatus for practicing those processes. The present invention can also be embodied in the form of computer program code including computer-readable instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. When implemented on a computer, the computer program code segments configure the computer to create specific logic circuits or processing modules.

While the preferred embodiments of the present invention have been shown and described herein, it will be obvious that such embodiments are provided by way of example only.

Numerous variations, changes and substitutions will occur to those of skill in the art without departing from the invention herein. Accordingly, it is intended that the invention be limited only by the spirit and scope of the appended claims.

What is claimed is:

1. A computerized method for managing a plurality of mobile assets using information indicative of actual usage of each asset, the method comprising:
   collecting data regarding each of a plurality of mobile assets;
   providing a set of rules comprising relationships for processing the collected data to determine a plurality of operational modes for each asset, each of said operational modes being associated with a distinct level of wear in an asset;
   processing the data relative to the set of rules to develop historical information regarding actual usage of each mobile asset, the information for said actual usage being arranged so as to list a plurality of operational modes accumulated for the asset over a selectable period of time; and
   distributing the information via a global information network.

2. The method of claim 1 wherein said historical information regarding actual usage of the asset is enhanced with environmental data collected during the actual usage of the asset, with said environmental data comprising at least one environmental parameter contributing to the level of wear of said asset.

3. The method of claim 1 further comprising determining a service recommendation for each respective mobile asset based on the actual usage of said respective mobile asset.

4. The method of claim 3 further comprising communicating said service recommendation to an operator of the mobile asset.

5. The method of claim 4 wherein said service recommendation includes suggesting a service center able to perform said service recommendation.

6. The method of claim 5 wherein the suggested service center is based on the position of the mobile asset relative to said service center.

7. The method of claim 6 wherein the suggested service center is further based on whether said service center is part of a chain of preferred service centers.

8. The method of claim 1, wherein the step of distributing information further comprises:
   linking a data center to the global information network;
   linking a service center for the mobile assets to the global information network; and
   posting a recommendation for a service activity for one of the plurality of mobile assets on a web site accessible via the global information network.

9. The method of claim 1, further comprising:
   collecting data regarding cargo being transported by the respective mobile assets;
   using the data regarding cargo to develop information regarding the cargo;
   and distributing the information regarding cargo via the global information network.

10. The method of claim 1 further comprising:
   collecting data regarding respective service functions provided through a respective one of the remote assets;
   using the data regarding the respective service functions to develop information regarding said functions; and
   distributing the information regarding said service functions via the global information network.

11. The method of claim 10, further comprising:
   developing a web site including a respective web page including information regarding the service functions performed for each one of a respective plurality of customers; and
   providing access to the respective web pages via the global information network to the respective plurality of customers.

12. A computerized method for managing a plurality of mobile assets using information indicative of actual usage of each asset, the method comprising:
   collecting data regarding each of a plurality of mobile assets;
   providing a set of rules comprising relationships for processing the collected data to determine a plurality of operational modes for each asset, each of said operational modes being associated with a distinct level of wear in an asset;
   processing the data relative to the set of rules to develop historical information regarding actual usage of each mobile asset, the information for said actual usage being arranged so as to list a plurality of operational modes accumulated for the asset over a period of time;
   using the historical information to develop a failure prediction for at least one of the plurality of remote assets; and
   distributing the information via a global information network.

13. A computerized method for managing a plurality of mobile assets using information indicative of actual usage of each asset, the method comprising:
   collecting data regarding each mobile asset of a plurality of mobile assets that together constitute a mobile asset system;
   providing a set of rules comprising relationships for processing the collected data to determine a plurality of operational modes for each asset, each of said operational modes being associated with a distinct level of wear in an asset;
   processing the data relative to the set of rules to develop historical information regarding actual usage of each said mobile asset, wherein said historical information is classified based on a plurality of operational modes accumulated for the asset over a selectable period of time;
   using the historical information to generate recommended operational settings for each asset so as to increase the performance and operating life of the mobile asset system; and
   distributing the operational settings via a global information network.

14. A system for managing a fleet of mobile assets using information indicative of actual usage of each asset, the system comprising:
   a data gathering element configured to collect data regarding each of a plurality of mobile assets;
   a memory device for storing a set of rules comprising relationships for processing the collected data to determine a plurality of operational modes for each asset, each of said operational modes being associated with a distinct level of wear in an asset;
   a processor configured to process the collected data relative to the set of rules to develop historical information regarding actual usage of each mobile asset, the information for said actual usage being arranged so as to list a plurality of operational modes accumulated for the asset over a selectable period of time; and a data link in communication with a global information network for distributing information related to the plurality of mobile assets.

15. A system for managing vehicles using information indicative of actual usage of each asset, the system comprising:
- a plurality of sensors carried on a vehicle for generating data indicative of the operation of the vehicle;
- a memory device carried on said vehicle for storing a set of rules comprising relationships for processing the generated data to determine a plurality of operational modes for each asset, each of said operational modes being associated with a distinct level of wear in an asset;
- a processor carried on the vehicle for processing said generated data relative to the set of rules to develop information indicative of the operation of the vehicle for its useful life; and
- a transmitter for transmitting said information to a global information network for communication to interested parties.

16. A system for managing vehicles using information indicative of actual usage of each asset, the system comprising:
- a plurality of sensors carried on a vehicle for generating data indicative of the operation of the vehicle;
- a transmitter for transmitting data from the vehicle to a data center;
- a receiver at the data center for receiving data transmitted from the vehicle;
- a memory device at the data center for storing a set of rules comprising relationships for processing data received at the data center to determine a plurality of operational modes for each asset, each of said operational modes being associated with a distinct level of wear in an asset;
- a processor at the data center for processing the received data relative to the set of rules to develop information indicative of the operation of the vehicle over the useful life of the vehicle; and
- a data link at the data center for transferring data indicative of the operation of the vehicle to a global information network for communication to interested parties.

17. A system for managing a vehicle within a fleet of vehicles using information indicative of actual usage of each asset, the system comprising:
- a plurality of sensors carried on a vehicle for generating data indicative of the operation of the vehicle;
- a memory device for gathering and recording operational data for the life of said vehicle;
- a data link in communication with the memory and with a global information network for transferring information relating to the operation of said vehicle to the network;
- a first processor configured to process the operational data relative to a set of rules comprising relationships for processing the operational data to determine a plurality of operational modes for said vehicle, wherein each of said operational modes is associated with a distinct level of wear in a vehicle in order to develop individual historical information regarding actual usage of each vehicle, the information for said actual usage being arranged so as to list the plurality of operational modes of the vehicle; and
- a second processor accessing a data base of fleet historical information data relating to the operation of other vehicles in the fleet corresponding to said vehicle and evaluating the individual historical information for said vehicle in light of said fleet historical information from said other vehicles in the fleet.

18. A computerized method for managing a plurality of mobile assets, the method comprising:
- collecting data regarding each of a plurality of mobile assets;
- processing the data to develop historical information regarding actual usage of each mobile asset, said actual usage being arranged in a plurality of operational modes of the asset, each of said operational modes being indicative of a respective state of health of said asset;
- establishing a cost/benefit evaluation of the mobile asset for a proposed future plan of use in light of the state of health of the mobile asset; and
- distributing the information via a global information network.

19. The method of claim 18 further comprising determining a service recommendation for each respective mobile asset based on the actual usage of said respective mobile asset.

20. The method of claim 18 wherein said economic value of each respective mobile asset is further based on whether any service recommendations for the asset have been complied with.

21. The method of claim 19 further comprising predicting faults likely to occur based on whether any service recommendations for the asset have been disregarded.

22. A computerized method for managing a plurality of mobile assets, the method comprising:
- collecting data regarding each of a plurality of mobile assets having warranties covering the operation of the mobile assets;
- processing the data to develop historical information regarding actual usage of each mobile asset, said actual usage being arranged in a plurality of operational modes of the asset;
- determining the remaining warranty coverage of each respective mobile asset based on the actual usage of the asset; and
- distributing the information via a global information network.

23. The method of claim 22 wherein said warranty coverage determining step comprises adjusting said coverage based on whether any service recommendations for the asset have been complied with.

24. The method of claim 1 wherein the mobile assets are railroad locomotives.

25. The method of claim 12 wherein the mobile assets are railroad locomotives.

26. The method of claim 13 wherein the mobile assets are railroad locomotives.

27. The system of claim 14 wherein the mobile assets are railroad locomotives.

28. The system of claim 15 wherein the vehicles are railroad locomotives.

29. The system of claim 16 wherein the vehicles are railroad locomotives.

30. The system of claim 17 wherein the vehicles are railroad locomotives.

31. The system of claim 18 wherein the vehicles are railroad locomotives.

32. The method of claim 22 wherein the mobile assets are railroad locomotives.

* * * * *